US012058707B2

(12) United States Patent
Zhao et al.

(10) Patent No.: US 12,058,707 B2
(45) Date of Patent: Aug. 6, 2024

(54) COMMUNICATION METHOD IN D2D SYSTEM, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 322 days.

(21) Appl. No.: 17/452,906

(22) Filed: Oct. 29, 2021

(65) Prior Publication Data
US 2022/0046632 A1 Feb. 10, 2022

Related U.S. Application Data

(63) Continuation of application No. PCT/CN2019/087114, filed on May 15, 2019.

(51) Int. Cl.
*H04W 72/51* (2023.01)
*H04L 27/26* (2006.01)
(Continued)

(52) U.S. Cl.
CPC ....... *H04W 72/51* (2023.01); *H04L 27/26025* (2021.01); *H04W 72/0446* (2013.01); *H04W 72/30* (2023.01)

(58) Field of Classification Search
CPC ............... H04L 5/0007; H04L 5/0094; H04L 27/26025; H04W 4/40; H04W 4/70;
(Continued)

(56) References Cited

U.S. PATENT DOCUMENTS 11,044,748 B2 * 6/2021 Cao .................. H04W 72/02
11,356,981 B2 * 6/2022 Chae ................ H04W 72/0446
(Continued)

FOREIGN PATENT DOCUMENTS

CN 107439050 A 12/2017
CN 109691003 A 4/2019
(Continued)

OTHER PUBLICATIONS

International Search Report dated Feb. 5, 2020 in App. No. PCT/CN2019/087114, Feb. 5, 2020, 4 pp.
(Continued)

*Primary Examiner* — Eric Nowlin
(74) *Attorney, Agent, or Firm* — Perkins Coie LLP (57) ABSTRACT

A communication method in a D2D system, a terminal device, and a network device, capable of avoiding interference to downlink transmission of a terminal device in a cell caused when another terminal device outside the cell uses a downlink transmission resource of the terminal device in the cell to carry out sidelink data transmission. The communication method in the D2D system includes: a first terminal device sends first indication information by means of a first physical sidelink channel, the first indication information being used for determining a time slot format of a cell in which the first terminal device is located.

8 Claims, 4 Drawing Sheets

(51) Int. Cl.
*H04W 72/0446* (2023.01)
*H04W 72/30* (2023.01)

(58) Field of Classification Search
CPC . H04W 72/02; H04W 72/0446; H04W 72/20; H04W 72/23; H04W 72/30; H04W 72/51; H04W 92/18
See application file for complete search history.

(56) References Cited

U.S. PATENT DOCUMENTS

| | | | | |
|---|---|---|---|---|
| 11,595,858 B2* | 2/2023 | Lee | | H04W 76/14 |
| 11,606,778 B2* | 3/2023 | Park | | H04W 72/02 |
| 11,659,552 B2* | 5/2023 | Wu | | H04L 5/0058 |
| | | | | 370/280 |
| 11,838,896 B2* | 12/2023 | Chae | | H04W 28/26 |
| 2017/0280445 A1 | 9/2017 | Jiang et al. | | |
| 2018/0376476 A1 | 12/2018 | Lee et al. | | |
| 2018/0376487 A1 | 12/2018 | Feng | | |
| 2019/0174530 A1* | 6/2019 | Kim | | H04W 72/12 |
| 2019/0327732 A1* | 10/2019 | Yoon | | H04W 72/23 |
| 2019/0342910 A1* | 11/2019 | Cao | | H04L 5/0091 |
| 2020/0037306 A1* | 1/2020 | Seo | | H04W 72/02 |
| 2020/0045697 A1* | 2/2020 | Choi | | H04W 72/0446 |
| 2020/0068532 A1* | 2/2020 | Bengtsson | | H04W 8/005 |
| 2020/0112982 A1* | 4/2020 | Li | | H04W 76/14 |
| 2020/0344026 A1* | 10/2020 | Ma | | H04W 72/23 |
| 2021/0099988 A1* | 4/2021 | Wu | | H04W 72/02 |
| 2021/0168764 A1* | 6/2021 | Su | | H04W 52/52 |
| 2021/0250910 A1* | 8/2021 | Park | | H04W 72/30 |
| 2021/0360624 A1* | 11/2021 | Zhang | | H04L 5/0055 |
| 2022/0030555 A1* | 1/2022 | Chae | | H04W 72/0446 |
| 2022/0046632 A1* | 2/2022 | Zhao | | H04W 72/0446 |
| 2022/0078760 A1* | 3/2022 | Su | | H04W 72/20 |
| 2022/0159767 A1* | 5/2022 | Zhang | | H04L 5/0023 |
| 2022/0232547 A1* | 7/2022 | Wang | | H04W 72/20 |
| 2022/0346064 A1* | 10/2022 | Chae | | H04W 28/26 |
| 2022/0346080 A1* | 10/2022 | Ren | | H04W 72/20 |
| 2023/0124535 A1* | 4/2023 | Luo | | H04W 72/0446 |
| | | | | 370/280 |
| 2023/0189217 A1* | 6/2023 | Wang | | H04W 72/0446 |
| | | | | 370/329 |
| 2023/0189302 A1* | 6/2023 | Luo | | H04L 5/0053 |
| | | | | 370/280 |

FOREIGN PATENT DOCUMENTS

| | | | | |
|---|---|---|---|---|
| EP | 3413478 A1 | | 12/2018 | |
| EP | 3857776 A1 * | | 8/2021 | ........... H04L 5/0007 |
| KR | 20220066360 A * | | 5/2020 | |
| RU | 2614527 C2 | | 3/2017 | |
| RU | 2615164 C2 | | 4/2017 | |
| WO | 2017165087 A1 | | 9/2017 | |
| WO | 2018012614 A1 | | 1/2018 | |
| WO | 2018174761 A1 | | 9/2018 | |
| WO | 2019027245 A1 | | 2/2019 | |
| WO | WO-2020064176 A1 * | | 4/2020 | ........... H04L 5/0007 |
| WO | WO-2021163705 A1 * | | 8/2021 | ....... H04L 27/26025 |

OTHER PUBLICATIONS

Oppo, "Discussion of synchronization mechanism for NR-V2X", 3GPP TSG RAN WG1 #97, Reno, USA, May 13-17, 2019, R1-1906474, May 2019, 4 pp.
Oppo, "Discussion on NR Uu controlling LTE sidelink", 3GPP TSG-RAN WG1 Meeting #97, Reno, USA, May 13-17, 2019, R1-1906480, May 2019, 4 pp.
Oppo, "Mode 1 resource allocation for NR SL", 3GPP TSG RAN WG1 #97, Reno, USA, May 13-17, 2019, R1-1906473, May 2019, 7 pp.
Examination Report No. 2 for Australian Application No. 2019446203 issued Dec. 23, 2022. 3 pages.
Oppo "Discussion of Uu-based sidelink resource allocation and configuration" R1-1812813; 3GPP TSG RAN WG1 Meeting #95; Spokane, USA; Nov. 12-16, 2018. 7 pages.
Oppo "Mode 1 resource allocation for NR SL" R1-1904918; 3GPP TSG RAN WG1 #96bis; Xi'an, China; Apr. 8-12, 2019. 5 pages.
The First Office Action for Chinese Application No. 202111383494.2 issued Nov. 28, 2022. 21 pages with English translation.
Examination Report for Indian Application No. 202127054529 issued Apr. 8, 2022. 8 pages with English translation.
Extended European Search Report for European Application No. 19928384.7 issued Mar. 14, 2022. 12 pages.
First Office Action for Russian Application No. 2021136570 issued Feb. 24, 2022. 6 pages with English translation.
Oppo "Enhancement of LTE Uu and NR Uu to control NR sidelink" R1-1810987; 3GPP TSG RAN WG1 Meeting #94bis; Chengdu, China; Oct. 8-12, 2018. 5 pages.
Spreadtrum Communications "Discussion on synchronization mechanism for NR V2X" R1-1906364; 3GPP TSG RAN WG1 Meeting #97; Reno, US; May 13-17, 2019. 10 pages.
Examination Report No. 1 for Australian Application No. 2019446203 issued Sep. 9, 2022. 3 pages.
Notice of Reasons for Refusal for Japanese Application No. 2021-567896 issued Nov. 1, 2022. 8 pages with English translation.
NTT Docomo, Inc. "Sidelink Synchronization Mechanism for NR V2X" R1-1906208; 3GPP TSG RAN WG1 #97; Reno, USA; May 13-17, 2019. 5 pages.
Sharp "Synchronization mechanism for NR sidelink" R1-1905394; 3GPP TSG RAN WG1 Meeting #96bis; Xi'an, China; Apr. 8-12, 2019. 5 pages.
Spreadtrum Communications "Discussion on physical layer structure for sidelink" R1-1904793; 3GPP TSG RAN WG1 #96bis; Xi'an, China; Apr. 8-12, 2019. 10 pages.
Examination Report of the European application No. 19928384.7, issued on Jul. 4, 2023. 8 pages.
Examiners call and proposed amendment of the European application No. 19928384.7, issued on Jun. 19, 2023. 4 pages.

* cited by examiner

| A first terminal device sends first indication information through a first physical sidelink channel, wherein the first indication information may be used for determining a slot format of a cell where the first terminal device is located | ⎯ 210 |

COMMUNICATION METHOD IN D2D SYSTEM, TERMINAL DEVICE, AND NETWORK DEVICE

CROSS-REFERENCE TO RELATED APPLICATION

The present application is a continuation application of International PCT Application No. PCT/CN2019/087114, filed on May 15, 2019, the entire content of which is hereby incorporated by reference.

TECHNICAL FIELD

Implementations of the present disclosure relate to the field of communication technologies, and more specifically, to a communication method in a D2D system, a terminal device, and a network device.

BACKGROUND

A communication mode of a Device to Device (D2D) system, such as a Vehicle to Everything (V2X) system, uses a Sidelink (SL) transmission technology. Unlike a mode in which data is received or sent through a network device in a traditional wireless communication system, a mode in which a terminal device communicates with another terminal device directly is used in the D2D system, thus having higher spectrum efficiency, and lower transmission delay.

In a Vehicle to Everything system based on a New Radio (NR) system or the like (NR-V2X), a flexible slot format may be supported within a cell, that is, an uplink time-domain symbol, and/or a downlink time-domain symbol, and/or a flexible time-domain symbol may be included within one slot, and the number of each type of time-domain symbols is configurable. Herein, the flexible time domain symbol represents an uncertain transmission direction, but the transmission direction may be changed by configuration information. For example, in the NR system, the network device may configure a slot format of one slot through a semi-static configuration signaling of the cell (such as a cell-specific Radio Resource Control (RRC) signaling), and may, based on this, change a transmission direction of a flexible symbol in one slot through a dynamic configuration signaling (such as Downlink Control Information (DCI)), or a terminal-specific semi-static configuration signaling (such as a UE-specific RRC signaling).

SUMMARY

Implementations of the present disclosure provide a communication method in a D2D system, a terminal device, and a network device, so as to avoid an interference on a downlink transmission of a terminal device within a cell, which is caused due to performing, by another terminal device outside the cell, a transmission of sidelink data by using a downlink transmission resource of the terminal device within the cell.

In a first aspect, a communication method in a D2D system is provided, including: sending, by a first terminal device, first indication information through a first physical sidelink channel, wherein the first indication information is used for determining a slot format of a cell where the first terminal device is located.

In a second aspect, another communication method in a D2D system is provided, including: sending, by a network device, configuration information to a first terminal device, for the first terminal device to determine first indication information according to the configuration information, and send the first indication information through a first physical sidelink channel, wherein the first indication information is used for determining a slot format of a cell where the first terminal device is located.

In a third aspect, a terminal device is provided, configured to perform the method according to the first aspect described above or various implementations thereof.

Specifically, the terminal device includes function modules, configured to perform the method according to the first aspect described above or various implementations thereof.

In a fourth aspect, a network device is provided, configured to perform the method according to the second aspect described above or various implementations thereof.

Specifically, the network device includes function modules, configured to perform the method according to the second aspect described above or various implementations thereof.

In a fifth aspect, a communication device is provided, including a processor and a memory. The memory is configured to store a computer program, and the processor is configured to invoke and run the computer program stored in the memory to perform the method according to any of the first to second aspects described above or various implementations thereof.

In a sixth aspect, a chip is provided, configured to implement the method according to any one of the first to second aspects described above or various implementations thereof.

Specifically, the chip includes: a processor, configured to invoke, from a memory, and run a computer program, so that a device having the chip installed therein performs the method according to any one of the first to second aspects described above or various implementations thereof.

In a seventh aspect, a computer readable storage medium is provided, configured to store a computer program, wherein the computer program causes a computer to perform the method according to any one of the first to second aspects described above or various implementations thereof.

In an eighth aspect, a computer program product is provided, including computer program instructions, wherein the computer program instructions cause a computer to perform the method according to any one of the first to second aspects described above or various implementations thereof.

In a ninth aspect, a computer program is provided, wherein when being run on a computer, the computer program causes the computer to perform the method according to any one of the first to second aspects described above or various implementations thereof.

Through the above technical solutions, on one hand, in the implementation of the present disclosure, the first terminal device sends the first indication information through the first physical sidelink channel, the first indication information being used for determining the slot format of the cell where the first terminal device is located, so that another terminal device outside the cell where the first terminal device is located can know the slot format configured by the first terminal device, and then no longer use the a downlink transmission resource of the first terminal device for the transmission of the sidelink data, thereby avoiding an interference on the downlink transmission of the terminal device within the cell, which is caused due to performing, by another terminal device outside the cell, the transmission of the sidelink data by using the downlink transmission resource of the terminal device within the cell, which can effectively improve reliability of the transmission of the terminal device.

Through the above technical solutions, on the other hand, in the implementation of the present disclosure, the network device sends the configuration information to the first terminal device, for the first terminal device to determine the first indication information according to the configuration information, and send the first indication information through the first physical sidelink channel, wherein the first indication information is used for determining the slot format of the cell where the first terminal device is located, so that another terminal device outside the cell where the first terminal device is located can know the slot format configured by the first terminal device, and then no longer use the downlink transmission resource of the first terminal device for the transmission of the sidelink data, thereby avoiding an interference on the downlink transmission of the terminal device within the cell, which is caused due to performing, by another terminal device outside the cell, the transmission of the sidelink data by using the downlink transmission resource of the terminal device within the cell, which can effectively improve the reliability of the transmission of the terminal device.

DETAILED DESCRIPTION

Technical solutions in implementations of the present disclosure will be described below with reference to the drawings in the implementations of the present disclosure. It is apparent that the implementations described are just a part of implementations of the present disclosure, but not all of the implementations of the present disclosure. According to the implementations of the present disclosure, all other implementations achieved by a person of ordinary skill in the art without making inventive efforts belong to the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1A:
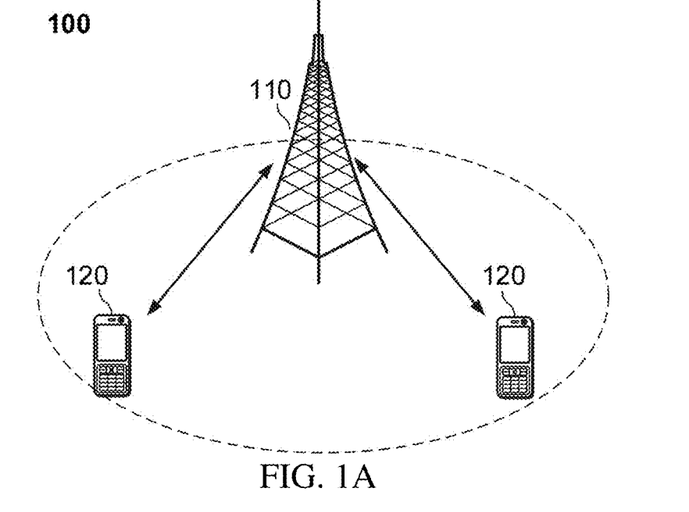
FIG. 1A is a schematic diagram of an architecture of a communication system in accordance with an implementation of the present disclosure.

Illustratively, a communication system 100 applied in an implementation of the present disclosure is shown in FIG. 1A. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in the LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage area of the network device 110. The "terminal device" as used herein includes, but is not limited to, an apparatus configured to receive/send a communication signal via a wired circuit connection, for example, via a connection of Public Switched Telephone Networks (PSTN), a Digital Subscriber Line (DSL), a digital cable, or a direct cable; and/or another data connection/network; and/or via a wireless interface, for instance, for a cellular network, a Wireless Local Area Network (WLAN), a digital television network such as a DVB-H network, a satellite network, or an AM-FM broadcast sender; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communication System (PCS) terminal that may combine a cellular radio phone with data processing, facsimile, and data communication abilities; a PDA that may include a radio phone, a pager, internet/intranet access, a Web browser, a memo pad, a calendar, and/or a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN.

Optionally, Device to Device (D2D) communication may be performed between the terminal devices 120.

Optionally, the 5G system or the 5G network may also be referred to as a New Radio (NR) system or an NR network.

Figure 1B:
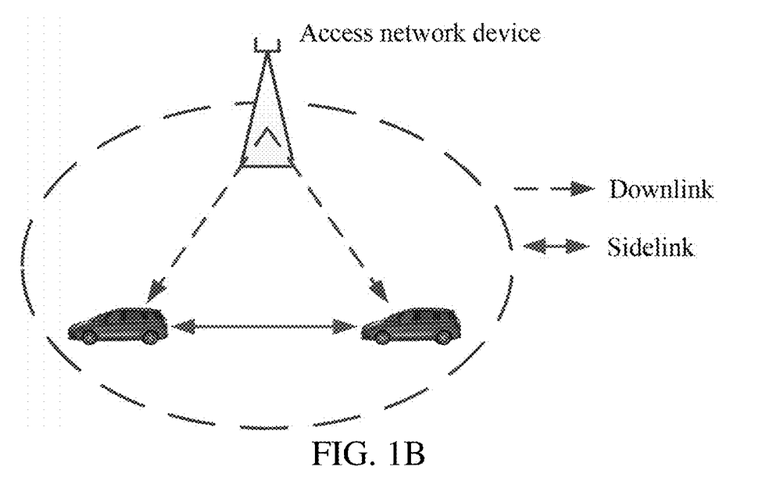
FIG. 1B is a schematic diagram of an architecture of a V2X system in accordance with an implementation of the present disclosure.

A mode in which a terminal device communicates with another terminal device directly is performed is used in a D2D system, such as a V2X system, having higher spectral efficiency and lower transmission delay. Between the terminal devices, transfer communication may be performed by an access network device based on a Uu interface, or direct communication may be performed based on a PC5 interface, as shown in FIG. 1B.

FIG. 1A illustrates exemplarily one network device and two terminal devices. Optionally, the communication system 100 may include multiple network devices, and another quantity of terminal devices may be included within the coverage area of each network device, which is not limited in the implementations of the present disclosure.

Optionally, the communication system 100 may also include another network entity, such as a network controller, a mobile management entity, or the like, which is not limited in the implementations of the present disclosure.

It should be understood that a device with a communication function in a network/system in the implementations of the present disclosure may also be referred to as a communication device. Taking the communication system 100 shown in FIG. 1A as an example, the communication device may include a network device 110 and terminal devices 120 which have communication functions, and the network device 110 and the terminal devices 120 may be the specific devices described above, which will not be repeated here again. The communication device may also include another device in the communication system 100, for example, another network entity such as a network controller, a mobile management entity, or the like, which is not limited in the implementations of the present disclosure.

It should be understood that the terms "system" and "network" are often used interchangeably herein. The term "and/or" herein is an association relationship describing associated objects only, indicating that three relationships may exist, for example, A and/or B may indicate three cases: A alone, both A and B, and B alone. In addition, the symbol "/" herein generally indicates that there is an "or" relationship between the associated objects before and after "/".

There are two transmission modes defined in 3GPP, i.e., transmission modes A and B.

In the transmission mode A, a transmission resource of the terminal device is allocated by the network device, the terminal device performs a transmission of sidelink data on a sidelink according to the transmission resource allocated by the network device; and the network device may allocate a transmission resource transmitted once for a terminal, or may allocate a transmission resource transmitted semi-statically for the terminal.

In the transmission mode B, the terminal device selects autonomously one transmission resource from a resource pool for the transmission of the sidelink data.

In a New Radio-Device to Device (NR-D2D) system or a New Radio-Vehicle to Everything (NR-V2X) system of a wireless communication system based on a New Radio (NR) system, a flexible slot format may be supported within a cell, that is, an uplink time-domain symbol, and/or a downlink time-domain symbol, and/or a flexible time-domain symbol may be included within one slot, and the number of each type of time-domain symbols is configurable. Herein, the flexible time domain symbol represents an uncertain transmission direction, which, however, may be changed by configuration information. For example, in the NR system, the network device may configure a slot format of one slot through a semi-static configuration signaling of the cell (such as a cell-specific Radio Resource Control (RRC) signaling), and may, based on this, change the transmission direction of the flexible symbol in one slot through a dynamic configuration signaling (such as Downlink Control Information (DCI)), or a terminal-specific semi-static configuration signaling (such as a UE-specific RRC signaling).

For example, in the NR system, a format of a slot format configured by configuration information TDD-UL-DL-ConfigCommon in an RRC signaling may include the following parameters: reference subcarrier spacing information, which may also be called referenceSubcarrierSpacing, and is used for determining a time domain boundary of an UL-DL pattern; pattern 1 and pattern 2, which are used for determining the UL-DL pattern, wherein pattern 2 is an optional configuration parameter; specifically, pattern 1 may include the following parameters: period information, which may also be called dl-UL-TransmissionPeriodicity, and is used for determining a period of the UL-DL pattern; indication information of the number of downlink slots, which may also be called nrofDownlinkSlots, and is used for determining that within each period, nrofDownlinkSlots slots, which start from a starting position of the period, are all-downlink slots; indication information of the number of downlink time domain symbols, which may also be called nrofDownlinkSymbols, and is used for determining that first nrofDownlinkSymbols time domain symbols in one slot after nrofDownlinkSlots all-downlink slots are downlink time domain symbols; indication information of the number of uplink slots, which may also be called nrofUplinkSlots, and is used for determining that within each period, last nrofUplinkSlots slots within the period are all-uplink slots; and indication information of the number of uplink time domain symbols, which may also be called nrofUplinkSymbols, and is used for determining that last nrofUplinkSymbols time domain symbols in one slot before nrofUplinkSlots all-uplink slots are uplink time domain symbols.

In the NR-V2X system, a sidelink transmission may be borne on a shared carrier or a proprietary carrier. The sidelink transmission is borne on the shared carrier, i.e., the sidelink transmission and an uplink transmission share one carrier, for example, both the sidelink transmission and the uplink transmission use a 2 GHz carrier; the sidelink transmission is borne on the proprietary carrier, i.e., the sidelink transmission and the uplink transmission use different carriers, or the sidelink transmission is borne on a carrier of an Intelligent Transportation System (ITS), for example, the sidelink transmission uses a 5.9 GHz carrier and the uplink transmission uses a 2 GHz carrier. If the sidelink transmission is borne on the shared carrier, in order to avoid influence on a downlink transmission, the sidelink transmission can only be transmitted on the uplink time domain symbol and/or on the flexible time domain symbol, but not on the downlink time domain symbol.

However, because another terminal device outside the cell does not know about the slot format configured by the terminal device within the cell, another terminal device may perform the transmission of the sidelink data by using a downlink transmission resource of the terminal device within the cell, thereby causing an interference on a downlink transmission of the terminal device within the cell.

However, in the NR-V2X system, the slot format within the cell may be configured by configuration information in the RRC signaling. Then, if all configuration information is sent to another terminal device outside the cell, very large signaling overhead will be caused. Therefore, in order to reduce the signaling overhead, a communication method in a D2D system needs to be provided urgently, without indicating all slot format information configured by the configuration information, but indicating part of the slot format information, thereby being able to avoid the interference on the downlink transmission of the terminal device within the cell due to performing, by another terminal device outside the cell, the transmission of the sidelink data by using the downlink transmission resource of the terminal device within the cell.

The network device involved in the present disclosure may be a mobility management device, such as an Access and Mobility Management Function (AMF) in a 5G core network, i.e., a Next Generation Core Network (NGCN), or a Mobility Management Entity (MME) in a 4G core network, i.e., an Evolved Packet Core Network (EPC), or may also be a policy control device, such as a Vehicle to Everything Control Function (V2X CF), or a Policy Control Function (PCF), etc., in the V2X system, which is not specifically limited in the present implementation.

Herein, both that the V2X CF is an independent network element, and that a function of the V2X CF is carried in the PCF are supported in a network structure, which is not specifically limited in the present implementation.

It should be noted that in all the descriptions of the present disclosure, slots are used as time units, and optionally, sub-frames may also be used as time units. Then, the slot format described may be a subframe structure. Accordingly, the uplink slot may be an uplink subframe, the downlink slot may be a downlink subframe, and a flexible slot may be a flexible subframe.

Figure 2A:
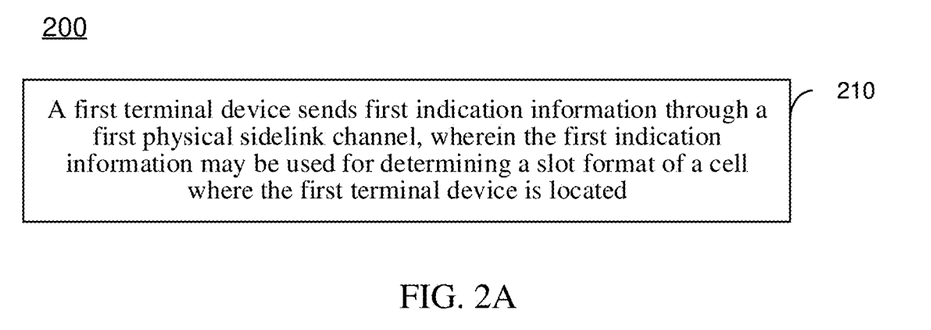
FIG. 2A is a schematic diagram of a communication method in a D2D system in accordance with an implementation of the present disclosure.

FIG. 2A is a schematic flow diagram of a communication method 200 in a D2D system in accordance with an implementation of the present disclosure, as shown in FIG. 2A.

In 210, a first terminal device sends first indication information through a first physical sidelink channel Herein, the first indication information may be used for determining a slot format of a cell where the first terminal device is located.

Then, the slot format of the cell where the first terminal device is located, which is determined by the first indication information, may include, but is not limited to, at least one set of the following information: uplink slot information and/or uplink time domain symbol information; downlink slot information and/or downlink time domain symbol information; or flexible slot information and/or flexible time domain symbol information.

Herein, the uplink slot information and/or the uplink time domain symbol information are a set of information, the downlink slot information and/or the downlink time domain symbol information are another set of information, and the flexible slot information and/or the flexible time domain symbol information are still another set of information.

Herein, the uplink slot information may include, but is not limited to, the number of uplink slots; the uplink time domain symbol information may include, but is not limited to, the number of uplink time domain symbols; the downlink slot information may include, but is not limited to, the number of downlink slots; the downlink time domain symbol information may include, but is not limited to, the number of downlink time domain symbols; the flexible slot information may include, but is not limited to, the number of flexible slots; and the flexible time domain symbol information may include, but is not limited to, the number of flexible time domain symbols.

Optionally, in one possible implementation mode of the present implementation, the V2X system may be applied in, then, in 210, specifically, the first terminal device may send the first indication information through a Physical Sidelink Broadcast Channel (PSBCH).

Optionally, in one possible implementation mode of the present implementation, the first indication information may also further be used for determining at least one kind of the following information: reference subcarrier spacing information; or period information.

It may be understood that the technical solution in this possible implementation may be applicable in any one of all the following possible implementations.

Optionally, in one possible implementation mode of the present implementation, the first indication information is used for determining a complete slot format of the cell where the first terminal device is located, that is, determining the uplink slot information and/or the uplink time domain symbol information, the downlink slot information and/or the downlink time domain symbol information, and the flexible slot information and/or the flexible time domain symbol information. Then, in 210, the first indication information may include at least two sets of the following indication information: indication information for determining the uplink slot information and/or the uplink time domain symbol information; indication information for determining the downlink slot information and/or the downlink time domain symbol information; or indication information for determining the flexible slot information and/or the flexible time domain symbol information.

Herein, the indication information for determining the uplink slot information and/or the uplink time domain symbol information is a set of indication information, the indication information for determining the downlink slot information and/or the downlink time domain symbol information is another set of indication information, and the indication information for determining the flexible slot information and/or the flexible time domain symbol information is still another set of indication information.

In the NR-V2X system, if the sidelink transmission may be borne a shared carrier, in order to avoid influence on the downlink transmission, the sidelink data may be transmitted on the uplink time domain symbol, and/or on the flexible time domain symbol, but cannot be transmitted on the downlink time domain symbol.

For example, if the sidelink data can only be transmitted on the uplink time domain symbol in the shared carrier, then the first indication information may include the indication information for determining the uplink slot information and/or the uplink time domain symbol information, and may also further include the indication information for determining the downlink slot information and/or the downlink time domain symbol information, and/or the indication information for determining the flexible slot information and/or the flexible time domain symbol information. Thus, the slot format of the cell where the first terminal device is located may then be determined according to the first indication information.

Optionally, in one possible implementation mode of the present implementation, the first indication information is used for determining the uplink slot information and/or uplink symbol information. Then, in 210, the first indication information may include the indication information for determining the uplink slot information and/or the uplink time domain symbol information, for indicating the uplink time domain symbol information in one period, but does not include the indication information for determining the downlink slot information and/or the downlink time domain symbol information.

Optionally, this implementation is applicable to performing a transmission of the sidelink data by using the uplink time domain symbol.

It should be noted that the indication information of the uplink slot and the uplink time domain symbol may specifically be one piece of indication information for indicating the uplink slot and the uplink time domain symbol, or two different pieces of indication information respectively, one piece of indication information being used for indicating the uplink slot, and the other piece of indication information being used for indicating the uplink time domain symbol, which is not specifically limited in the present implementation.

Accordingly, the indication information of the downlink slot and the downlink time domain symbol may specifically be one piece of indication information for indicating the downlink slot and the downlink time domain symbol, or two different pieces of indication information respectively, one piece of indication information being used for indicating the downlink slot, and the other piece of indication information being used for indicating the downlink time domain symbol, which is not specifically limited in the present implementation.

For example, if the sidelink data can only be transmitted on the uplink time domain symbol in the shared carrier, then the first indication information may only include the indication information for determining the uplink slot information and/or the uplink time domain symbol information, such as indication information of the number of uplink slots nrofUplinkSlots (9 bits), or indication information of the number of uplink time domain symbols nrofUplinkSymbols (4 bits), while does not need to include the indication information for determining the downlink slot information and/or the downlink time domain symbol information, such as indication information of the number of downlink slots nrofDownlinkSlots (9 bits), or indication information of the number of downlink time domain symbols nrofDownlinkSymbols (4 bits). Thus, signaling overhead can be effectively saved, indicating that the signaling overhead of each mode (i.e., pattern 1, or pattern 2) may be reduced by 13 bits.

It should be noted that the names of specific indication information in the above examples and the following examples use the original name of the indication information in the RRC signaling, or other new names may also be used, which is not specifically limited in the present implementation.

Then, if only the pattern 1 is configured, the first indication information indicating the slot format of the pattern 1 may need only 19 bits, i.e., reference subcarrier spacing information referenceSubcarrierSpacing of 3 bits, period information dl-UL-TransmissionPeriodicity of 3 bits, indication information of the number of uplink slots nrofUplinkSlots of 9 bits, and indication information of the number of uplink time domain symbols nrofUplinkSymbols of 4 bits. If both the pattern 1 and the pattern 2 are configured at the same time, the first indication information indicating the slot formats of the pattern 1 and the pattern 2 may need 35 bits.

So far, another terminal device outside the cell where the first terminal device is located can know, according to the first indication information, the uplink slot information and/or the uplink symbol information configured by the first terminal device, and then can directly determine the uplink time domain symbol on which the sidelink data can be transmitted. Since the first indication information does not include the indication information for determining the downlink slot information and/or the downlink time domain symbol information, a purpose of reducing signaling overhead may be achieved.

Optionally, in one possible implementation mode of the present implementation, the first indication information is used for determining the downlink slot information and/or downlink symbol information. Then, in 210, the first indication information may include the indication information for determining the downlink slot information and/or the downlink time domain symbol information, for indicating the downlink time domain symbol information in one period, but does not include the indication information for determining the uplink slot information and/or the uplink time domain symbol information.

Optionally, this implementation is applicable to performing a transmission of the sidelink data by using the uplink time domain symbol and/or the flexible time domain symbol.

For example, if the sidelink data can be transmitted on the uplink time domain symbol and the flexible time domain symbol in the shared carrier, the first indication information may only include the indication information for determining the downlink slot information and/or the downlink time domain symbol information, such as indication information of the number of downlink slots nrofDownlinkSlots (9 bits), or indication information of the number of downlink time domain symbols nrofDownlinkSymbols (4 bits), but does not need to include the indication information for determining the uplink slot information and/or the uplink time domain symbol information, such as indication information of the number of uplink slots nrofUplinkSlots (9 bits), or indication information of the number of uplink time domain symbols nrofUplinkSymbols (4 bits). Thus, the signaling overhead can be effectively saved, indicating that the signaling overhead of each mode (i.e., the pattern 1 or the pattern 2) may be reduced by at most 13 bits, or by at least 4 bits.

Then, if only the pattern 1 is configured, the first indication information indicating the slot format of the pattern 1 may only need 19 bits, i.e., reference subcarrier spacing information referenceSubcarrierSpacing of 3 bits, period information dl-UL-TransmissionPeriodicity of 3 bits, indication information of the number of downlink slots nrofDownlinkSlots of 9 bits, and indication information of the number of downlink time domain symbols nrofDownlinkSymbols of 4 bits. If both the pattern 1 and the pattern 2 are configured at the same time, the first indication information indicating the slot formats of the pattern 1 and the pattern 2 may need 35 bits.

So far, another terminal device outside the cell where the first terminal device is located can know, according to the first indication information, the downlink slot information and/or the downlink symbol information configured by the first terminal device, then can further know, according to other related information in the configuration information, such as period information, or the like, that other time domain symbol except the downlink time domain symbol are the uplink time domain symbol and the flexible time domain symbol, and then may determine the uplink time domain symbol and the flexible time domain symbol on which the sidelink data can be transmitted. Since the first indication information does not include the indication information for determining the uplink slot information and/or the uplink time domain symbol information, the purpose of reducing the signaling overhead may be achieved.

In the two possible implementations described above, since the information indicated by the first indication information is not all slot format information configured by a network device for the first terminal device, but part of the slot format information, the signaling overhead can be effectively reduced.

In the present disclosure, all the slot format information configured by the network device for the first terminal device does not need to be indicated, but part of the slot format information is indicated, so that the signaling overhead may be reduced. In addition, the terminal device outside the cell may determine an uplink transmission resource or a downlink transmission resource within the cell according to the first indication information. Therefore, a terminal outside the cell may perform the transmission of the sidelink data using the uplink transmission resource within the cell, or avoid performing the transmission of the sidelink data using the downlink transmission resource within the cell, thereby avoiding an interference on the downlink transmission of the terminal device within the cell.

Optionally, in one possible implementation mode of the present implementation, before 210, the network device may also further send the configuration information to the first terminal device. Then, after the first terminal device receives the configuration information sent by the network device, the first terminal device may then determine the first indication information according to the configuration information.

In one specific implementation process, the first terminal device may then determine the first indication information according to the configuration information, wherein the first indication information may include at least one piece of the following information: reference subcarrier spacing information; period information; indication information for determining uplink slot information; the indication information for determining the uplink time domain symbol information; the indication information for determining the downlink slot information; the indication information for determining the downlink time domain symbol information; the indication information for determining the flexible slot information; or the indication information for determining the flexible time domain symbol information.

The configuration information may include at least one piece of the following information: the reference subcarrier spacing information; the period information; indication information of the number of uplink slots; indication information of the number of uplink time domain symbols; indication information of the number of downlink slots; indication information of the number of downlink time domain symbols; indication information of the number of flexible slots; or indication information of the number of flexible time domain symbols.

Specifically, a value of the first indication information may belong to a first set, and a value of the configuration information may belong to a second set or a third set. Herein, the third set may then be a subset of the second set.

Thus, by limiting a value range of the configuration information in the configuration information, i.e., the second set, that is, limiting the value range to be the first set or the third set, it is realized to represent a value range of the first indication information by using a relatively few quantity of bits, which can effectively reduce the signaling overhead.

In one specific implementation process, if the value of the configuration information belongs to the second set, at this time, there are no limitations on values in the second set. Then, the first set may then be a subset of the second set, thus the first set is limited.

At this time, because the value range of the first indication information, i.e., the first set, is limited, it is caused that a value range of the first set is narrowed, thereby reducing the signaling overhead.

For example, a value range of reference subcarrier spacing information referenceSubcarrierSpacing in existing configuration information TDD-UL-DL-ConfigCommon includes values in {15, 30, 60, 120, 240} kHz, etc. When the sidelink transmission works on the shared carrier, the value range of this parameter may be limited, thereby reducing the signaling overhead. For example, the value range of referenceSubcarrierSpacing may be {15, 60} kHz, wherein the value of referenceSubcarrierSpacing is 15 kHz for Frequency Range 1 (FR1), and 60 kHz for Frequency Range 2 (FR2), and at this time needs to be presented by only 1 bit; or as another example, the value range of referenceSubcarrierSpacing may be {60, 120} kHz, wherein the value of referenceSubcarrierSpacing is 60 kHz for the FR1, and 120 kHz for the FR2, and at this time referenceSubcarrierSpacing needs to be presented by only 1 bit.

Alternatively, pattern 1 and pattern 2 in the existing configuration information TDD-UL-DL-ConfigCommon are taken as another example, wherein the pattern 2 is an optional parameter. When the sidelink transmission works on the shared carrier, it may be limited that only the pattern 1 is configured, while the pattern 2 is no longer configured, thereby reducing the signaling overhead.

Alternatively, as another example, a value range of period information dl-UL-TransmissionPeriodicity in the existing configuration information TDD-UL-DL-ConfigCommon includes values in {0.5, 0.625, 1, 1.25, 2, 2.5, 5, 10} ms, etc. When the sidelink transmission works on the shared carrier, the value range of this parameter may be limited, thereby reducing the signaling overhead. For example, the value range of dl-UL-TransmissionPeriodicity may be {0.5, 2} ms, and at this time needs to be represented by only 1 bit; or as another example, the value range of dl-UL-TransmissionPeriodicity may be {0.125, 1} ms, and at this time needs to be represented by only 1 bit.

Transmission delay of the sidelink data can also be effectively reduced by limiting the value range of the period information dl-UL-TransmissionPeriodicity. Illustration may be made below by taking values of dl-UL-TransmissionPeriodicity being 10 ms and 2 ms as examples respectively, which limits the value range of this parameter, and can also further reduce the transmission delay of the sidelink data effectively.

Figure 2B:
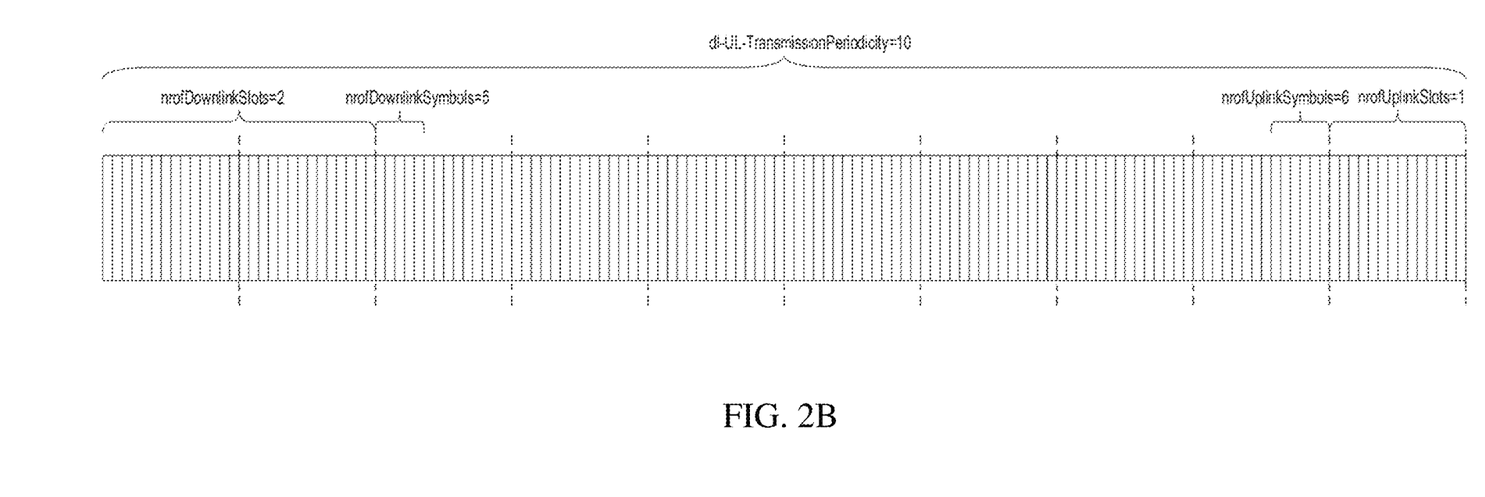
FIG. 2B is a schematic diagram of one slot format configured by configuration information TDD-UL-DL-ConfigCommon in the implementation corresponding to FIG. 2A.

FIG. 2B is a schematic diagram of one slot format configured by configuration information TDD-UL-DL-ConfigCommon in the implementation corresponding to FIG. 2A. As shown in FIG. 2B, dl-UL-TransmissionPeriodicity is configured to be 10 ms, and referenceSubcarrierSpacing is configured to be 15 kHz, that is, one period may include 10 slots, wherein each slot includes two all-downlink slots and one all-uplink slot, the first five time domain symbols of the third slot are downlink time domain symbols, the last six time domain symbols of the last second slot are uplink time domain symbols, and the remaining middle portions are all flexible time domain symbols. For the NR-V2X system, if the sidelink data is transmitted on the uplink transmission resource, only the last two slots of eight slots may be used for the transmission of the sidelink data, and the first six slots cannot be used for the transmission of the sidelink data, which thus will result in the transmission delay, being very difficult to meet delay requirement of the NR-V2X system, such as time domain requirement being 3 to 5 milliseconds (ms).

Figure 2C:
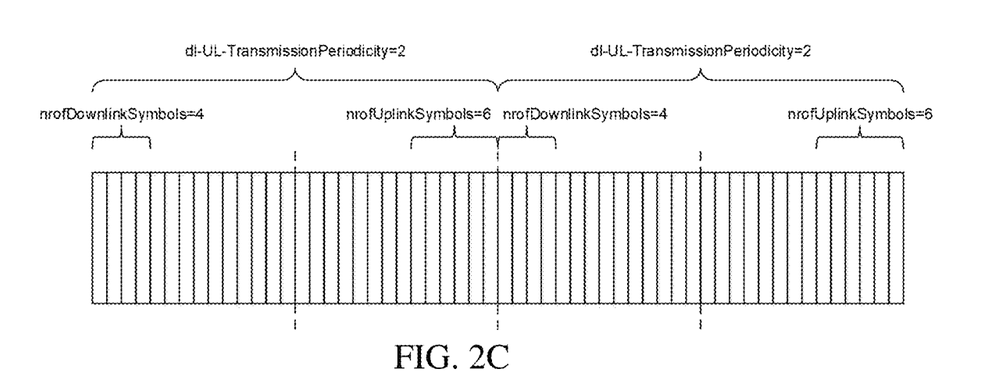
FIG. 2C is a schematic diagram of another slot format configured by configuration information TDD-UL-DL-ConfigCommon in the implementation corresponding to FIG. 2A.

Therefore, if the sidelink transmission works on the shared carrier, dl-UL-TransmissionPeriodicity configured by the configuration information TDD-UL-DL-ConfigCommon then needs to be limited. As shown in FIG. 2C, dl-UL-TransmissionPeriodicity is configured to be 2 ms, and referenceSubcarrierSpacing is configured to be 15 kHz, that is, one period may include 2 slots, wherein each slot includes 0 all-downlink slots (i.e., there is no all-downlink slot), and the last 6 time domain symbols of the last slot are uplink time domain symbols, and the remaining middle portions are all flexible time domain symbols. For the NR-V2X system, if the sidelink data is transmitted on the uplink transmission resource, the uplink time domain symbol in one slot of every two slots may be used for the transmission of the sidelink data, so that excessive transmission delay will not be caused, and the delay requirement (3 to 5 ms) of the NR-V2X system can be met.

Alternatively, as another example, a value range of indication information of the number of uplink slots nrofUplinkSlots in the existing configuration information TDD-UL-DL-ConfigCommon is 0 to 320, and needs to be presented by 9 bits. When the sidelink transmission works on the shared carrier, the value range of this parameter may be limited, thereby reducing the signaling overhead. For example, the value range of indication information of the number of uplink slots nrofUplinkSlots is 0 to 7, and needs to be presented by only 3 bits.

It may be understood that after value ranges of other parameters are limited, the value range of this parameter is reduced accordingly, so similarly, the signaling overhead may also be reduced.

For example, a value range of referenceSubcarrierSpacing is {15, 60} kHz, wherein 15 kHz is used by default for the FR1, and 60 kHz is used by default for the FR2. A value range of dl-UL-TransmissionPeriodicity is {0.125, 1} ms. Herein, a value of 1 ms of dl-UL-TransmissionPeriodicity corresponds to the FR1, and combining the value of referenceSubcarrierSpacing in the FR1 being 15 kHz, that is, one period including only one slot, at this time this parameter is 0, that is, this parameter is not needed, and it is only needed that nrofUplinkSymbols configures uplink time domain symbols in one slot. A value of 0.125 ms of dl-UL-TransmissionPeriodicity corresponds to FR2, and combining the value of referenceSubcarrierSpacing in the FR2 being 15 kHz, that is, one period including only one slot, at this time this parameter is 0, that is, this parameter is not needed, and it is only needed that nrofUplinkSymbols configures uplink time domain symbols in one slot.

Alternatively, as another example, the value range of referenceSubcarrierSpacing is {15, 60} kHz, wherein 15 kHz is used by default for the FR1, and 60 kHz is used by default for the FR2. The value range of dl-UL-TransmissionPeriodicity is {0.5, 2} ms. Herein, a value of 2 ms of dl-UL-TransmissionPeriodicity corresponds to the FR1, and combining the value of referenceSubcarrierSpacing in the FR1 being 15 kHz, that is, one period including only two slots, at this time nrofUplinkSlots may take a value of 0, or 1, that is, the value needs to be presented by 1 bit. If both of the two slots in this period may be configured to be all-uplink slots, nrofUplinkSlots may be configured to be 1, and nrofUplinkSymbols may be configured to be 14, i.e., two all-uplink slots may be represented. A value of 0.5 ms of dl-UL-TransmissionPeriodicity corresponds to the FR2, and combining the value of referenceSubcarrierSpacing in the FR2 being 60 kHz, that is, one period including only two slots, at this time nrofUplinkSlots may take a value of 0, or 1, that is, the value needs to be presented by 1 bit. If both of the two slots in this period may be configured to be all-uplink slots, nrofUplinkSlots may be configured to be 1, and nrofUplinkSymbols may be configured to be 14, i.e., two all-uplink slots may be represented.

Alternatively, as another example, similar to the indication information of the number of uplink slots nrofUplinkSlots, when the sidelink transmission works on the shared carrier, a value range of the indication information of the number of downlink slots nrofDownlinkSlots in the existing configuration information TDD-UL-DL-ConfigCommon may be limited, thereby reducing the signaling overhead.

Alternatively, as another example, the indication information for determining the flexible slot information and/or the indication information for determining the flexible time domain symbol information in the first indication information may be determined according to the indication information of the number of flexible slots and/or the indication information of the number of flexible time domain symbols in the configuration information, or may also be determined according to the indication information of the number of uplink slots, and/or the indication information of the number of uplink time domain symbols, and/or the indication information of the number of downlink slots, and/or the indication information of the number of downlink time domain symbols in the configuration information, which is not specifically limited in the present implementation.

Taking the first indication information including all parameters in the configuration information TDD-UL-DL-ConfigCommon in the first indication information sent by the PSBCH as an example, the value range of the first indication information is limited, and the number of bits required to indicate each parameter is as follows: a value range of referenceSubcarrierSpacing may be {15, 60} kHz—1 bit; only the pattern 1 is configured, and the pattern 2 is not configured; a value range of dl-UL-TransmissionPeriodicity is {0.5, 2} ms—1 bit; a value range of nrofUplinkSlots is 0, 1—1 bit; a value range of nrofDownlinkSlots is 0, 1—1 bit; a value range of nrofUplinkSymbols is 0-13—4 bits; and a value range of nrofDownlinkSymbols is 0-13—4 bits.

Therefore, indication information of 12 bits needs to be transmitted in the PSBCH, for indicating the slot format.

In another specific implementation process, the technical solution in the previous implementation process may be applied in several aforementioned possible implementations, such that the signaling overhead can be further reduced on the basis of the aforementioned implementations.

Taking the first indication information including indication information of the uplink time domain symbol in the configuration information TDD-UL-DL-ConfigCommon in the first indication information sent by the PSBCH as an example, the value range of the first indication information is limited, and the number of bits required to represent each parameter is as follows: a value range of referenceSubcarrierSpacing may be {15, 60} kHz—1 bit; only the pattern 1 is configured, and the pattern 2 is not configured; optional values of the parameter dl-UL-TransmissionPeriodicity include {0.5, 2} ms—1 bit; an optional value range of the parameter nrofUplinkSlots is 0, 1—1 bit; and an optional value range of nrofUplinkSymbols is 0 to 13—4 bits.

Therefore, indication information of 7 bits needs to be transmitted in the PSBCH, for indicating the slot format.

In another specific implementation process, if the value of the configuration information belongs to the third set, then values in the second set are limited directly as the third set. Since the third set has already been a subset of the second set, the first set may then use a set which is the same as the third set, which can achieve the purpose of limiting the first set.

A detailed description of a specific limitation of the third set may refer to the related content of limiting the value range of the first indication information in the aforementioned two implementation processes.

In another specific implementation process, if the value of the configuration information belongs to the second set, at this time, there are no limitations on the values in the second set. Then, the first set may then be a subset of the second set, and at this time, in addition to determining the first indication information by using the technical solutions provided in the aforementioned implementation processes, the first terminal device may also optionally determine other parameters in the first indication information according to a relationship between reference subcarrier spacing information of the first indication information and reference subcarrier spacing information of the configuration information.

For example, the value of referenceSubcarrierSpacing in the first indication information is 15 kHz, i.e., refSCS1=15 kHz, and the value of referenceSubcarrierSpacing in the configuration information is 30 kHz, that is, a slot length or a time domain symbol length determined according to refSCS1 is twice a slot length or a time domain symbol length determined according to refSCS2. Therefore, the first terminal device may then determine values of the indication information for determining the uplink slot information, the indication information for determining the uplink time domain symbol information, the indication information for determining the downlink slot information, and the indication information for determining the downlink time domain symbol information in the first indication information, as half of values of the corresponding indication information of the number of uplink slots, indication information of the number of uplink time domain symbols, indication information of the number of downlink slots, and indication information of the number of downlink time domain symbols in the configuration information.

It should be noted that in the technical solutions of the present disclosure, the value of the configuration information, or the value of the first indication information, or values in the third set are limited, indicating that the number of candidate values is limited. The specific value may be the same as or different from a value of a candidate parameter of existing network configuration information. For example, the value range of the parameter dl-UL-TransmissionPeriodicity in the network configuration information includes values in {0.5, 0.625, 1, 1.25, 2, 2.5, 5, 10} ms, etc. When the value range of this parameter is limited, values of this parameter may be {0.5, 2} ms, that is, be the same as the values of the candidate parameter of the existing parameter; and the values of this parameter may be {0.25, 2} ms, wherein 0.25 ms is different from the value of the candidate parameter of the existing parameter.

It should be noted that, although the above descriptions of the technical solutions of the present disclosure are all illustrated by taking the V2X system, the technical solutions of the present disclosure can also be applicable to another D2D system.

In the present implementation, the first terminal device sends the first indication information through the first physical sidelink channel, the first indication information being used for determining at least one piece of the following information: the slot format of the cell where the first terminal device is located; the uplink slot information and/or the uplink time domain symbol information; and the downlink slot information and/or t downlink time domain symbol information, so that another terminal device outside the cell where the first terminal device is located can know about the slot format configured by the first terminal device, and then no longer perform the transmission of the sidelink data by using a downlink transmission resource of the first terminal device, thereby avoiding the interference on the downlink transmission of the terminal device within the cell, which is caused due to performing, by another terminal device outside the cell, the transmission of the sidelink data by using the downlink transmission resource of the terminal device within the cell, which can effectively improve reliability of the transmission of the terminal device.

In addition, according to the technical solutions provided in the present disclosure, since the information indicated by the first indication information is part of the slot format information, the signaling overhead can be effectively reduced.

Figure 3:
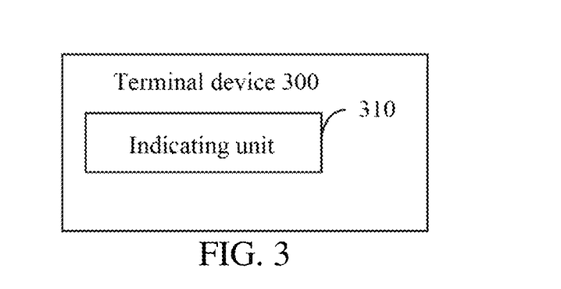
FIG. 3 is a schematic block diagram of a terminal device in accordance with an implementation of the present disclosure.

FIG. 3 is a schematic block diagram of a terminal device 300 in accordance with an implementation of the present disclosure, as shown in FIG. 3. The present implementation provides a terminal device, configured to perform the method performed by the terminal device in the implementation corresponding to FIG. 1.

Specifically, the terminal device 300 includes function modules configured to perform the method performed by the terminal device in the implementation corresponding to FIG. 1. The terminal device 300 may include an indicating unit 310, which may be configured to send first indication information through a first physical sidelink channel, wherein the first indication information is used for determining a slot format of a cell where the terminal device is located.

Then, the slot format of the cell where the first terminal device is located, which is determined by the first indication information, may include, but is not limited to, at least one set of the following information: uplink slot information and/or uplink time domain symbol information; downlink slot information and/or downlink time domain symbol information; or flexible slot information and/or flexible time domain symbol information.

Herein, the uplink slot information and/or the uplink time domain symbol information are one set of information, the downlink slot information and/or the downlink time domain symbol information are another set of information, and the flexible slot information and/or the flexible time domain symbol information are still another set of information.

Optionally, in one possible implementation mode of the present implementation, the first indication information is used for determining a complete slot format of the cell where the first terminal device is located, that is, determining the uplink slot information and/or the uplink time domain symbol information, the downlink slot information and/or the downlink time domain symbol information, and the flexible slot information and/or the flexible time domain symbol information. Then, the first indication information may then include at least two sets of the following indication information: indication information for determining the uplink slot information and/or the uplink time domain symbol information; indication information for determining the downlink slot information and/or the downlink time domain symbol information; and indication information for determining the flexible slot information and/or the flexible time domain symbol information.

Herein, the indication information for determining the uplink slot information and/or the uplink time domain symbol information is one set of indication information, the indication information for determining the downlink slot information and/or the downlink time domain symbol information is another set of indication information, and the indication information for determining the flexible slot information and/or the flexible time domain symbol information is still another set of indication information.

In the NR-V2X system, if a sidelink transmission may be borne on a shared carrier, in order to avoid influence on a downlink transmission, sidelink data is transmitted on an uplink time domain symbol, or on a flexible time domain symbol, but cannot be transmitted on a downlink time domain symbol.

For example, if the sidelink data can only be transmitted on the uplink time domain symbol in the shared carrier, the first indication information may then include the indication information for determining the uplink slot information and/or the uplink time domain symbol information, and may further include the indication information for determining the downlink slot information and/or the downlink time domain symbol information, and/or the indication information for determining the flexible slot information and/or the flexible time domain symbol information. Thus, the slot format of the cell where the first terminal device is located may be determined according to the first indication information.

Optionally, in one possible implementation mode of the present implementation, the first indication information is used for determining the uplink slot information and/or uplink symbol information. Then, the first indication information may include the indication information for determining the uplink slot information and/or the uplink time domain symbol information, without including the indication information for determining the downlink slot information and/or the downlink time domain symbol information.

Optionally, in one possible implementation mode of the present implementation, the first indication information is used for determining the downlink slot information and/or downlink symbol information. Then, the first indication information may include the indication information for determining the downlink slot information and/or the downlink time domain symbol information, without including the indication information for determining the uplink slot information and/or the uplink time domain symbol information.

Optionally, in one possible implementation mode of the present implementation, the first indication information may also be further used for determining at least one kind of the following information: reference subcarrier spacing information; or period information.

Optionally, in one possible implementation mode of the present implementation, the indicating unit 310 may also be further configured to receive configuration information sent by a network device; and determine the first indication information according to the configuration information.

In one specific implementation process, the indicating unit 310 may be specifically configured to determine the first indication information according to the configuration information, wherein the first indication information may include at least one piece of the following information: the reference subcarrier spacing information; the period information; the indication information for determining the uplink slot information; the indication information for determining the uplink time domain symbol information; the indication information for determining the downlink slot information; the indication information for determining the downlink time domain symbol information; the indication information for determining the flexible slot information; or the indication information for determining the flexible time domain symbol information.

The configuration information may include at least one piece of the following information: the reference subcarrier spacing information; the period information; indication information of the number of uplink slots; indication information of the number of uplink time domain symbols; indication information of the number of downlink slots; indication information of the number of downlink time domain symbols; indication information of the number of flexible slots; or indication information of the number of flexible time domain symbol.

Herein, a value of the first indication information belongs to a first set; a value of the configuration information belongs to a second set or a third set, wherein the third set is a subset of the second set; and the first set is a subset of the second set.

Optionally, in one possible implementation mode of the present implementation, the indicating unit 310 may be specifically configured to send the first indication information through a Physical Sidelink Broadcast Channel (PSBCH).

Figure 4:
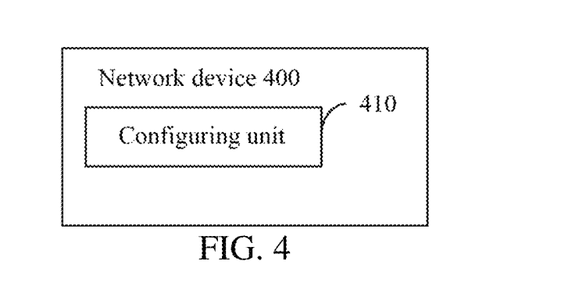
FIG. 4 is a schematic block diagram of a network device in accordance with an implementation of the present disclosure.

FIG. 4 is a schematic block diagram of a network device 400 in accordance with an implementation of the present disclosure, as shown in FIG. 4. The present implementation provides a network device, configured to perform the method performed by the network device in the implementation corresponding to FIG. 1.

Specifically, the network device 400 includes function modules configured to perform the method performed by the network device in the implementation corresponding to FIG. 1. The network device 400 may include a configuring unit 410, which may be configured to send configuration information to a first terminal device, for the first terminal device to determine first indication information according to the configuration information, and send the first indication information through a first physical sidelink channel, wherein the first indication information is used for determining a slot format of a cell where the first terminal device is located.

Then, the slot format of the cell where the first terminal device is located, which is determined by the first indication information, may include, but is not limited to, at least one set of the following information: uplink slot information and/or uplink time domain symbol information; downlink slot information and/or downlink time domain symbol information; or flexible slot information and/or flexible time domain symbol information.

Herein, the uplink slot information and/or the uplink time domain symbol information are one set of information, the downlink slot information and/or the downlink time domain symbol information are another set of information, and the flexible slot information and/or the flexible time domain symbol information are still another set of information.

Optionally, in one possible implementation mode of the present implementation, the first indication information is used for determining a complete slot format of the cell where the first terminal device is located, that is, determining the uplink slot information and/or the uplink time domain symbol information, the downlink slot information and/or the downlink time domain symbol information, and the flexible slot information and/or the flexible time domain symbol information. Then, the first indication information may include at least two sets of the following indication information: indication information for determining the uplink slot information and/or the uplink time domain symbol information; indication information for determining the downlink slot information and/or the downlink time domain symbol information; or indication information for determining the flexible slot information and/or the flexible time domain symbol information.

Herein, the indication information for determining the uplink slot information and/or the uplink time domain symbol information is one set of indication information, the indication information for determining the downlink slot information and/or the downlink time domain symbol information is another set of indication information, and the indication information for determining the flexible slot information and/or the flexible time domain symbol information is still another set of indication information.

In the NR-V2X system, if a sidelink transmission may be borne on a shared carrier, in order to avoid influence on a downlink transmission, sidelink data is transmitted on an uplink time domain symbol, or a flexible time domain symbol, but cannot be transmitted on a downlink time domain symbol.

For example, if the sidelink data can only be transmitted on the uplink time domain symbol in the shared carrier, the first indication information may then include the indication information for determining the uplink slot information and/or the uplink time domain symbol information, and may further include the indication information for determining the downlink slot information and/or the downlink time domain symbol information, and/or the indication information for determining the flexible slot information and/or the flexible time domain symbol information. Thus, the slot format of the cell where the first terminal device is located may be determined according to the first indication information.

Optionally, in one possible implementation mode of the present implementation, the first indication information is used for determining the uplink slot information and/or uplink symbol information. Then, the first indication information may include the indication information for determining the uplink slot information and/or the uplink time domain symbol information, without including the indication information for determining the downlink slot information and/or the downlink time domain symbol information.

Optionally, in one possible implementation mode of the present implementation, the first indication information is used for determining the downlink slot information and/or downlink symbol information. Then, the first indication information may include the indication information for determining the downlink slot information and/or the downlink time domain symbol information, without including the indication information for determining the uplink slot information and/or the uplink time domain symbol information.

Optionally, in one possible implementation mode of the present implementation, the first indication information may also be further used for determining at least one kind of the following information: reference subcarrier spacing information; or period information.

Optionally, in one possible implementation mode of the present implementation, the first indication information may specifically include first indication information. Then, the first indication information may then be determined by the first terminal device according to the configuration information, wherein the first indication information may include at least one piece of the following information: reference subcarrier spacing information; period information; the indication information for determining the uplink slot information; the indication information for determining the uplink time domain symbol information; the indication information for determining the downlink slot information; the indication information for determining the downlink time domain symbol information; the indication information for determining the flexible slot information; or the indication information for determining the flexible time domain symbol information.

The configuration information may include at least one piece of the following information: the reference subcarrier spacing information; the period information; indication information of the number of uplink slots; indication information of the number of uplink time domain symbols; indication information of the number of downlink slots; indication information of the number of downlink time domain symbols; indication information of the number of flexible slots; or indication information of the number of flexible time domain symbol.

Herein, a value of the first indication information belongs to a first set, and a value of the configuration information belongs to a second set or a third set, wherein the third set is a subset of the second set; and the first set is a subset of the second set.

Figure 5:
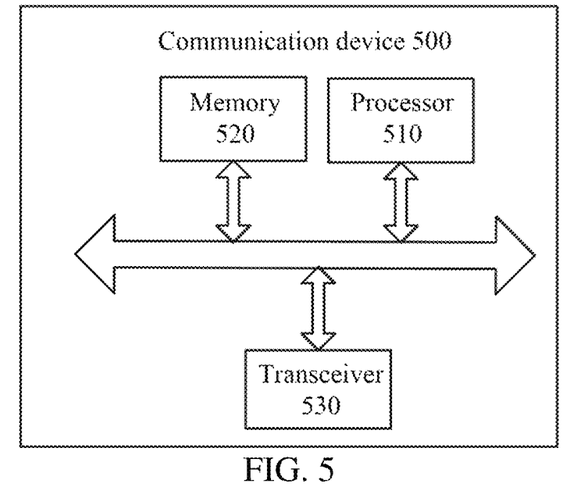
FIG. 5 is a schematic block diagram of a communication system in accordance with an implementation of the present disclosure.

FIG. 5 is a schematic structural diagram of a communication device 500 in accordance with an implementation of the present disclosure. The communication device 500 shown in FIG. 5 includes a processor 510, which may invoke, from a memory, and run a computer program to implement the methods in the implementations of the present disclosure.

Optionally, as shown in FIG. 5, the communication device 500 may further include a memory 520. Herein, the processor 510 may invoke, from the memory 520, and run the computer program to implement the methods in the implementations of the present disclosure.

Herein, the memory 520 may be a separate device independent of the processor 510, or may be integrated in the processor 510.

Optionally, as shown in FIG. 5, the communication device 500 may further include a transceiver 530. The processor 510 may control the transceiver 530 to communicate with another device. Specifically, the transceiver 530 may send information or data to another device, or receive information or data sent by another device.

Herein, the transceiver 530 may include a transmitter and a receiver. The transceiver 530 may further include antennas, the number of which may be one or more.

Optionally, the communication device 500 may be specifically the network device in accordance with the implementations of the present disclosure, and the communication device 500 may implement the corresponding processes implemented by the network device in various methods in the implementations of the present disclosure, which will not be repeated here again for brevity.

Optionally, the communication device 500 may be specifically the terminal device in accordance with the implementations of the present disclosure, and the communication device 500 may implement the corresponding processes implemented by the terminal device in various methods in the implementations of the present disclosure, which will not be repeated here again for brevity.

Figure 6:
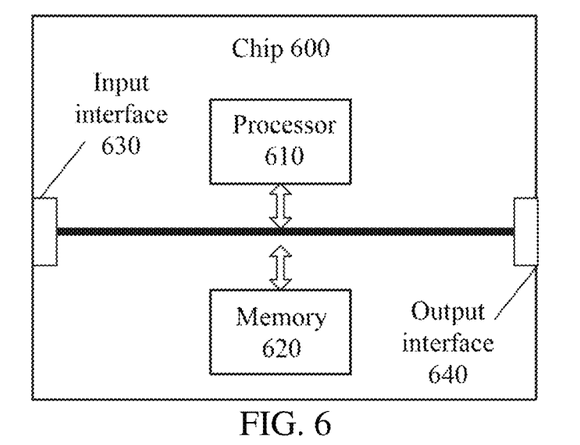
FIG. 6 is a schematic block diagram of a chip in accordance with an implementation of the present disclosure.

FIG. 6 is a schematic structural diagram of a chip 600 in accordance with an implementation of the present disclosure. The chip 600 shown in FIG. 6 includes a processor 610, which may invoke, from a memory, and run a computer program to implement the methods in the implementations of the present disclosure.

Optionally, as shown in FIG. 6, the chip 600 may further include a memory 620. Herein, the processor 610 may invoke, from the memory 620, and run the computer program to implement the methods in the implementations of the present disclosure.

Herein, the memory 620 may be a separate device independent of the processor 610, or may be integrated in the processor 610.

Optionally, the chip 600 may further include an input interface 630. Herein, the processor 610 may control the input interface 630 to communicate with another device or chip. Specifically, the processor 610 may acquire information or data sent by another device or chip.

Optionally, the chip 600 may further include an output interface 640. Herein, the processor 610 may control the output interface 640 to communicate with another device or chip. Specifically, the processor 610 may output information or data to another device or chip.

Optionally, the chip may be applied to the network device in the implementations of the present disclosure, and the chip may implement the corresponding processes implemented by the network device in various methods in the implementations of the present disclosure, which will not be repeated here again for brevity.

Optionally, the chip may be applied to the terminal device in the implementations of the present disclosure, and the chip may implement the corresponding processes implemented by the terminal device in various methods in the implementations of the present disclosure, which will not be repeated here again for brevity.

It should be understood that the chip mentioned in the implementation of the present disclosure may also be referred to as a system-level chip, a system chip, a chip system, or a system chip-on-chip, etc.

Figure 7:
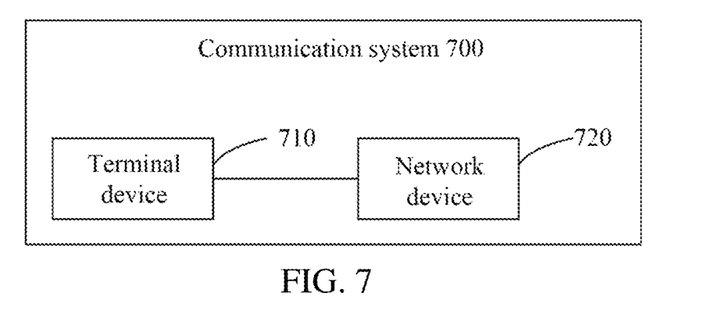
FIG. 7 is a schematic block diagram of a communication system in accordance with an implementation of the present disclosure.

FIG. 7 is a schematic block diagram of a communication system 700 in accordance with an implementation of the present disclosure. As shown in FIG. 7, the communication system 700 includes a terminal device 710 and a network device 720.

Herein, the terminal device 710 may be configured to implement the corresponding functions implemented by the terminal device in the methods described above, and the network device 720 may be configured to implement the corresponding functions implemented by the network device in the methods described above, which will not be repeated here again for brevity.

It should be understood that the processor in the implementations of the present disclosure may be an integrated circuit chip, having a signal processing capability. In an implementation process, each of the acts of the foregoing method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. Various methods, acts and logical block diagrams disclosed in the implementations of the present disclosure may be implemented or performed. The general purpose processor may be a microprocessor, or the processor may also be any conventional processor, or the like. An act combined with the methods disclosed in the implementations of the present disclosure may be directly embodied to be performed and completed by a hardware decoding processor, or may be performed and completed by a combination of hardware and software modules in a decoding processor. The software modules may be located in a storage medium which is mature in the art, such as a random access memory, a flash memory, a read-only memory, a programmable read-only memory or an electrically erasable programmable memory, a register, or the like. The storage medium is located in the memory, and the processor reads information in the memory, and completes the acts of the foregoing methods in combination with hardware thereof.

It may be understood that the memory in the implementations of the present disclosure may be a volatile memory or a non-volatile memory, or may include both a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through the exemplary but non-restrictive description, many forms of RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and the methods described herein is intended to include, but not be limited to, these and any other suitable types of memories.

It should be understood that the foregoing memory is described in an exemplary but non-limiting sense. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), or a Direct Rambus RAM (DR RAM), or the like. That is, the memory in the implementations of the present disclosure is intended to include, but not be limited to, these and any other suitable types of memories.

An implementation of the present disclosure further provides a computer readable storage medium, configured to store a computer program.

Optionally, the computer readable storage medium may be applied to the network device in the implementations of the present disclosure, and the computer program causes the computer to perform the corresponding processes implemented by the network device in various methods in accordance with the implementations of the present disclosure, which will not be repeated here again for brevity.

Optionally, the computer readable storage medium may be applied to the terminal device in the implementations of the present disclosure, and the computer program causes the computer to perform the corresponding processes implemented by the terminal device in various methods in accordance with the implementations of the present disclosure, which will not be repeated here again for brevity.

An implementation of the present disclosure further provides a computer program product, including computer program instructions.

Optionally, the computer program product may be applied to the network device in the implementations of the present disclosure, and the computer program instructions cause the computer to perform the corresponding processes implemented by the network device in various methods in accordance with the implementations of the present disclosure, which will not be repeated here again for brevity.

Optionally, the computer program product may be applied to the terminal device in the implementations of the present disclosure, and the computer program instructions cause the computer to perform the corresponding processes implemented by the terminal device in various methods in accordance with the implementations of the present disclosure, which will not be repeated here again for brevity.

An implementation of the present disclosure further provides a computer program.

Optionally, the computer program may be applied to the network device in the implementations of the present disclosure. The computer program, when being run on a computer, causes the computer to perform the corresponding processes implemented by the network device in various methods in accordance with the implementations of the present disclosure, which will not be repeated here again for brevity.

Optionally, the computer program may be applied to the terminal device in the implementations of the present disclosure. The computer program, when being run on a computer, causes the computer to perform the corresponding processes implemented by the terminal device in various methods in accordance with the implementations of the present disclosure, which will not be repeated here again for brevity.

A person of ordinary skill in the art may recognize that units and algorithm acts in various examples described in combination with the implementations disclosed herein can be implemented in electronic hardware, or a combination of computer software and electronic hardware. Whether these functions are performed in a hardware or software mode depends on a specific application and a design constraint condition of the technical solution. Skilled artisans may use different methods to implement the described functions for each specific application, but such an implementation should not be considered to be beyond the scope of the present disclosure.

Those skilled in the art may clearly learn that for the sake of convenience and conciseness of description, specific working processes of the systems, apparatuses, and units described above may refer to the corresponding processes in the above method implementations, which will not be repeated here again.

In several implementations provided by the present disclosure, it should be understood that the disclosed systems, apparatuses, and methods may be implemented in another mode. For example, the apparatus implementations described above are only illustrative, for example, the division of the units is only a logical function division, and there may be another division mode in an actual implementation. For example, multiple units or components may be combined or integrated into another system, or some features may be ignored, or not executed. At another point, the shown or discussed coupling or direct coupling or communication connection between each other may be indirect coupling or a communication connection through some interfaces, apparatuses, or units, or may be in electrical, mechanical, or another form.

The unit described as a separate component may or may not be physically separated, and the component shown as a unit may or may not be a physical unit, i.e., it may be located in one place, or may be distributed across multiple network units. Part or all of the units therein may be selected according to an actual need to achieve the purpose of the solutions of the present implementations.

In addition, various functional units in various implementations of the present disclosure may be integrated into one processing unit, or various units may exist physically separately, or two or more than two units may be integrated into one unit.

The function, if implemented in the form of a software functional unit and sold or used as an independent product, may be stored in a computer-readable storage medium. Based on such understanding, the technical solution of the present disclosure, in essence, or the part contributing to the prior art, or part of the technical solution, may be embodied in the form of a software product, which is stored in one storage medium, and includes several instructions for causing a computer device (which may be a personal computer, a server, or a network device, etc.) to perform all or part of the acts of the methods described in various implementations of the present disclosure. And the aforementioned storage medium includes: various media, such as a U disk, a mobile hard disk, a Read-Only Memory (ROM), a Random Access Memory (RAM), a magnetic disk, or an optical disk, etc., which may store program codes.

What are described above are merely specific implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What is claimed is:

1. A communication method in a device to device (D2D) system, comprising:
   sending, by a first terminal device, first indication information through a first physical sidelink channel, wherein the first indication information is used for determining a slot format of a cell where the first terminal device is located; wherein the slot format of the cell where the first terminal device is located comprises:
   uplink slot information and/or uplink time domain symbol information;
   wherein the first indication information is used for determining uplink slot information and/or uplink symbol information, the first indication information comprises indication information for determining the uplink slot information and/or the uplink time domain symbol information, but does not comprise indication information for determining downlink slot information and/or downlink time domain symbol information;
   wherein before sending, by the first terminal device, the first indication information through the first physical sidelink channel, the method further comprising:
   receiving, by the first terminal device, configuration information sent by a network device, wherein the configuration information comprises at least following information parameters: period information, indication information of a number of uplink slots, reference subcarrier spacing information, and indication information of a number of uplink time domain symbols;
   determining, by the first terminal device, the first indication information according to the configuration information, wherein the first indication information comprises the following information parameters: period information and indication information for determining uplink slot information.

2. The communication method of claim 1, wherein the first indication information is further used for determining period information.

3. The communication method of claim 1, wherein sending, by the first terminal device, the first indication information through the first physical sidelink channel comprises:
   sending, by the first terminal device, the first indication information through a Physical Sidelink Broadcast Channel (PSBCH).

4. A terminal device, comprising: a processor and a transceiver, wherein
   the transceiver is configured to send first indication information through a first physical sidelink channel, wherein the first indication information is used for determining a slot format of a cell where the terminal device is located; wherein the slot format of the cell where the first terminal device is located comprises:
   uplink slot information and/or uplink time domain symbol information;
   wherein the first indication information is used for determining uplink slot information and/or uplink symbol information, the first indication information comprises indication information for determining the uplink slot information and/or the uplink time domain symbol information, but does not comprise indication information for determining downlink slot information and/or downlink time domain symbol information;
   wherein the transceiver is further configured to:
   receive configuration information sent by a network device, and determine the first indication information according to the configuration information, wherein the configuration information comprises at least following information parameters: period information, indication information of a number of uplink slots, reference subcarrier spacing information, and indication information of a number of uplink time domain symbols;
   the processor is specially configured to:
   determine the first indication information according to the configuration information, wherein the first indication information comprises the following information parameters: period information and indication information for determining uplink slot information.

5. The terminal device of claim 4, wherein the first indication information is further used for determining period information.

6. The terminal device of claim 4, wherein the transceiver is specifically configured to:
   send the first indication information through a Physical Sidelink Broadcast Channel (PSBCH).

7. A network device, comprising: a processor and a transceiver, wherein
   the transceiver is configured to send configuration information to a first terminal device, for the first terminal device to determine first indication information according to the configuration information and to send the first indication information through a first physical sidelink channel, wherein the first indication information is used for determining a slot format of a cell where the first terminal device is located; wherein the slot format of the cell where the first terminal device is located comprises: uplink slot information and/or uplink time domain symbol information; wherein the first indication information is used for determining uplink slot information and/or uplink symbol information; wherein the configuration information comprises at least following parameters: period information, indication information of a number of uplink slots, reference subcarrier spacing information, and indication information of a number of uplink time domain symbols;
   wherein the first indication information is determined by the first terminal device according to the configuration information, wherein, the first indication information comprises the following parameters: period information and indication information of a number of uplink slots.

8. The network device of claim 7, wherein the first indication information is further used for determining period information.

* * * * *